United States Patent [19]

Sarh

[11] Patent Number: 4,717,330
[45] Date of Patent: Jan. 5, 1988

[54] APPARATUS FOR MAKING A STRUCTURAL COMPONENT

[75] Inventor: Branko Sarh, Watertown, Mass.

[73] Assignee: Messerschmitt-Boelkow-Blohm Gesellschaft mit beschraenkter Haftung, Munich, Fed. Rep. of Germany

[21] Appl. No.: 932,686

[22] Filed: Nov. 18, 1986

Related U.S. Application Data

[62] Division of Ser. No. 670,472, Nov. 9, 1984, Pat. No. 4,633,632.

[30] Foreign Application Priority Data

Nov. 17, 1983 [DE] Fed. Rep. of Germany ....... 3341564

[51] Int. Cl.[4] ...................... B29C 41/40; B29C 65/70
[52] U.S. Cl. ...................................... 425/403; 249/96;
249/146; 249/152; 249/171; 249/180; 249/184;
425/389; 425/470
[58] Field of Search ...................... 425/470, 389, 403;
249/10, 11, 17, 63, 78, 79, 96, 97, 144, 146, 152,
155, 162, 170, 171, 180, 181, 184; 156/189

[56] References Cited

U.S. PATENT DOCUMENTS

| | | | |
|---|---|---|---|
| 1,802,815 | 4/1931 | Hilton | 249/11 |
| 2,298,839 | 10/1942 | Porter | 425/63 |
| 3,590,590 | 7/1971 | Vujasinovic | 425/63 |
| 4,448,628 | 5/1984 | Stott | 249/184 |
| 4,512,837 | 4/1985 | Sarh et al. | 156/189 |

FOREIGN PATENT DOCUMENTS

| | | | |
|---|---|---|---|
| 0065314 | 11/1982 | European Pat. Off. | 249/17 |
| 711282 | 6/1954 | United Kingdom | 249/11 |

Primary Examiner—Jay H. Woo
Assistant Examiner—James C. Housel
Attorney, Agent, or Firm—W. G. Fasse; D. H. Kane, Jr.

[57] ABSTRACT

A structural component having a curved wall, such as an aircraft fuselage or pipe, has a grid structure formed of box frames produced by winding tapes of fiber reinforced synthetic material, so-called prepregs, onto mold bodies. These mold bodies are then assembled on a mandrel for covering with a planking and curing whereby the tapes are bonded together to form stringers intersecting with ribs in a grid structure and whereby the planking is bonded to the grid structure. The ribs are reinforced by fiber reinforced belt segments of synthetic material inserted into gaps between adjacent short ends of the mold bodies, whereby these belt segments are bonded to the ribs during curing. The belt segments ave a width corresponding to a multiple of the width of the stringers and hence protrude radially inwardly. Preferably, an edge reinforcing strip of fiber reinforced material is arranged alongside the radially inner edge of the belt segments. The mandrel carries support rings which are axially displaceable along the mandrel and which carry mold body support plates by radially adjustable members for placing the support plates into a plurality of different positions for assembling, curing and mold body removal.

12 Claims, 11 Drawing Figures

APPARATUS FOR MAKING A STRUCTURAL COMPONENT

CROSS-REFERENCE TO RELATED APPLICATIONS

This is a divisional of application Ser. No.: 670,472 filed now U.S. Pat. No. 4,633,632 Nov. 9, 1984.

The present invention relates to the disclosure of U.S. Ser. No. 540,705, filed on Oct. 11, 1983, now U.S. Pat. No. 4,524,556, as an FWC of U.S. Ser. No. 228,680, filed on Jan. 26, 1981, now abandoned. The present disclosure is also related to U.S. Ser. No. 544,112, filed on Oct. 20, 1983, now U.S. Pat. No. 4,512,834, as a continuation-in-part of U.S. Ser. No. 540,705.

FIELD OF THE INVENTION

The invention relates to a structural component having a curved wall such as an aircraft fuselage or a pipe. The invention also relates to an apparatus for making such curved-wall structural components.

DESCRIPTION OF THE PRIOR ART

Large structural components such as an aircraft wing have been constructed heretofore of fiber reinforced synthetic material formed into longitudinally extending stringers and crosswise extending ribs forming a grid structure covered also by a fiber reinforced synthetic material planking. The grid structure is formed from box frames produced by a winding or bandaging method. The so produced box frames are then assemled to form the large wall or surface and to cure the box frames, whereby the longitudinal side portions of two adjacent box frames form the longitudinal stringers and the end portions of two adjacent box frames form the ribs, all bonded together as a result of the curing. The planking is also bonded to the grid structure as a result of the curing.

Structural components of fiber reinforced materials constructed as mentioned above, are statically equivalent to respective sheet metal structures which thus can be replaced by fiber composite material structures of substantially reduced weight, yet of comparable size. By suitably designing and manufacturing such components of fiber composite material, it is further possible to reduce the manufacturing costs by providing for a single heat compression curing operation in which as many elements as possible of a large structural component are bonded to each other simultaneously while they are being cured.

The above mentioned related U.S. Patent Applications disclose such a large scale structural component comprising an outer skin forming the planking on an inner grid structure forming a stiffening frame. The outer skin or planking is first formed apart from the grid structure inside a gluing or bonding apparatus by laminating fiber webbings impregnated with a synthetic material, so-called prepregs, onto a separate support. The grid structure itself also is manufactured in a separate apparatus by assembling rectangular mold bodies, to the side and end surfaces of which the prepreg tapes or webbing strips have already been applied by a winding or bandaging operation, into a substantially flat grid structure which is then compressed in the longitudinal and cross directions for the bonding of the prepregs to each other to form the longitudinal stringers and the crosswise extending ribs. The scaffold or support which holds the so formed grid structure is then lowered onto the prelaminated planking in the gluing apparatus and the entire combination is cured in a hot pressing operation.

Structural components produced as just described are essentially flat and, depending on their shape, they may be used as floor elements, wings, tail unit shells including rudder and/or elevator unit shells. The required curvature for these shells is provided by the outline or so-called sheer of the respective component which in turn is accomplished by a respective shape of the mold bodies. The just described manufacturing operations and devices are not suitable for making aircraft fuselages and the like, for example large diameter pipe sections.

OBJECTS OF THE INVENTION

In view of the foregoing it is the aim of the invention to achieve the following objects singly or in combination:

to construct a structural component having a curved wall in such a manner that it may be used for assembling an entire aircraft fuselage or pipe section, or the like;

to construct an aircraft fuselage or other substantially cylindrical body of box frames made of fiber reinforced synthetic materials in such a way that substantially all of the elements may be in their still uncured condition when they are assembled, so that the entire fuselage and thus all its components are cured simultaneously in a hot pressing operation;

to provide an apparatus for manufacturing such large scale three-dimensional bodies, whereby the box frame assembly, the laminating of the planking onto the box frames, and the mold body removal may all take place in the same apparatus; and to construct the apparatus in such a way that it may itself function as the pressurizable container or so-called autoclave so that separate large scale autoclaves are not necessary anymore.

SUMMARY OF THE INVENTION

According to the invention the structural components are constructed with rib reinforcing belt segments also made of fiber reinforced synthetic material and having a width dimensioned corresponding to a multiple of a width dimension of the above mentioned stringers for reinforcing the respective rib. Preferably, the rib reinforcing belt segments are themselves also reinforced by an edge strip of fiber reinforced synthetic material running along the edge of the belt protruding below the respective rib radially inwardly.

The apparatus according to the invention is so constructed that groups of mold bodies are arranged around the circumference of a wheel rim type ring which itself is supported on a mandrel while carrier plates for the individual mold bodies are secured to the outer circumference of the wheel rim ring by means of radial drives such as hydraulic cylinders and by means of radial guides such as a cylindrical rod guided in a guide bushing. The arrangement is such that the carrier plates and thus the mold bodies are radially adjustable by the radial drives. A plurality of wheel rim rings are provided which are supported on the mandrel by longitudinal or axial guide rails for locating the wheel rim rings in the axial direction along the mandrel. Thus, by the radial adjustment of the carrier plates and mold bodies it is possible to assemble the mold bodies into a position in which they define the cylindrical body to be formed. On the other hand, the locating of the wheel rim rings in the axial direction makes it possible to provide initially a certain gap between adjacent mold body ends for inserting the above mentioned rib reinforcing belt segments which are then compressed between two short ends of longitudinally adjacent mold bodies for the subsequent curing and bonding. In this manner very large scale tubular bodies may be formed.

Another advantage of the invention is seen in that the structural features of the invention enable a large scale automation of the manufacturing steps, whereby the assembly of the entire structural component such as an aircraft fuselage can be accomplished with prepreg layers which have not yet been cured or hardened and so that the hardening of all the elements of the component can take place simultaneously in a hot pressing operation, whereby a structural component may be made as a seamless cylinder or a seamless conical shape. Sectional shells of this type may also be manufactured separately and then connected to each other along a seam.

BRIEF DESCRIPTION OF THE DRAWINGS:

In order that the invention may be clearly understood, it will now be described, by way of example, with reference to the accompanying drawings, wherein.

Figure 1:
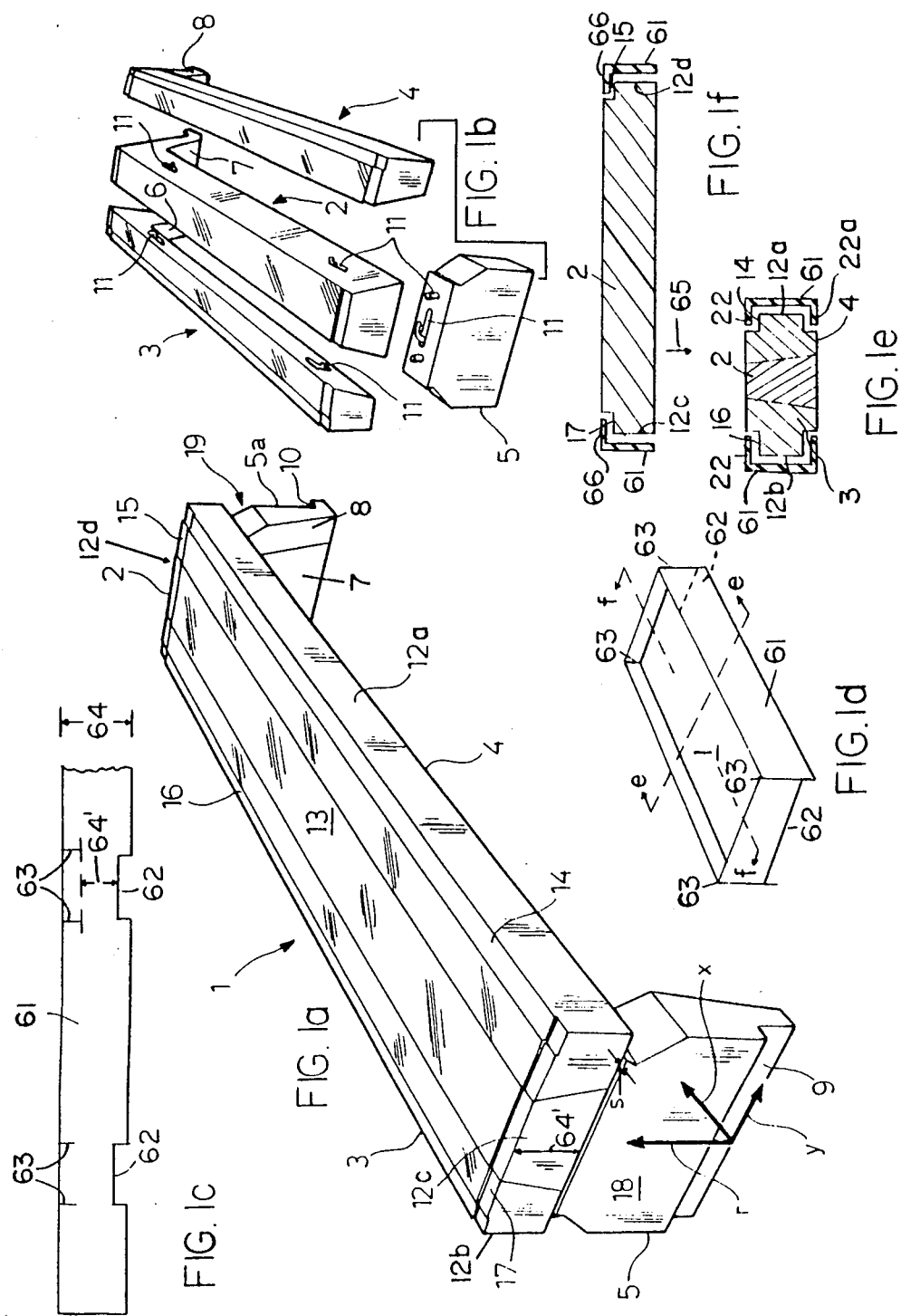
FIG. 1a is a perspective view of a mold body according to the invention.
FIG. 1b shows a perspective view of the mold body of FIG. 1a in its disassembled condition.
FIG. 1c shows a top plan view of a fiber reinforced synthetic material prepreg webbing or tape to be wound around the mold body for forming box frames.
FIG. 1d shows a schematic perspective view of a mold body with the prepreg tape or webbing wound around the side and end surfaces of the mold body prior to the folding of the edges.
FIG. 1e shows a sectional view along section line e—e in FIG. 1, however, after the folding of the longitudinal edges.
FIG. 1f shows a sectional view along section line f—f in FIG. 1d, however, after the folding of the top edges along the short ends of the mold body.
Figure 4:
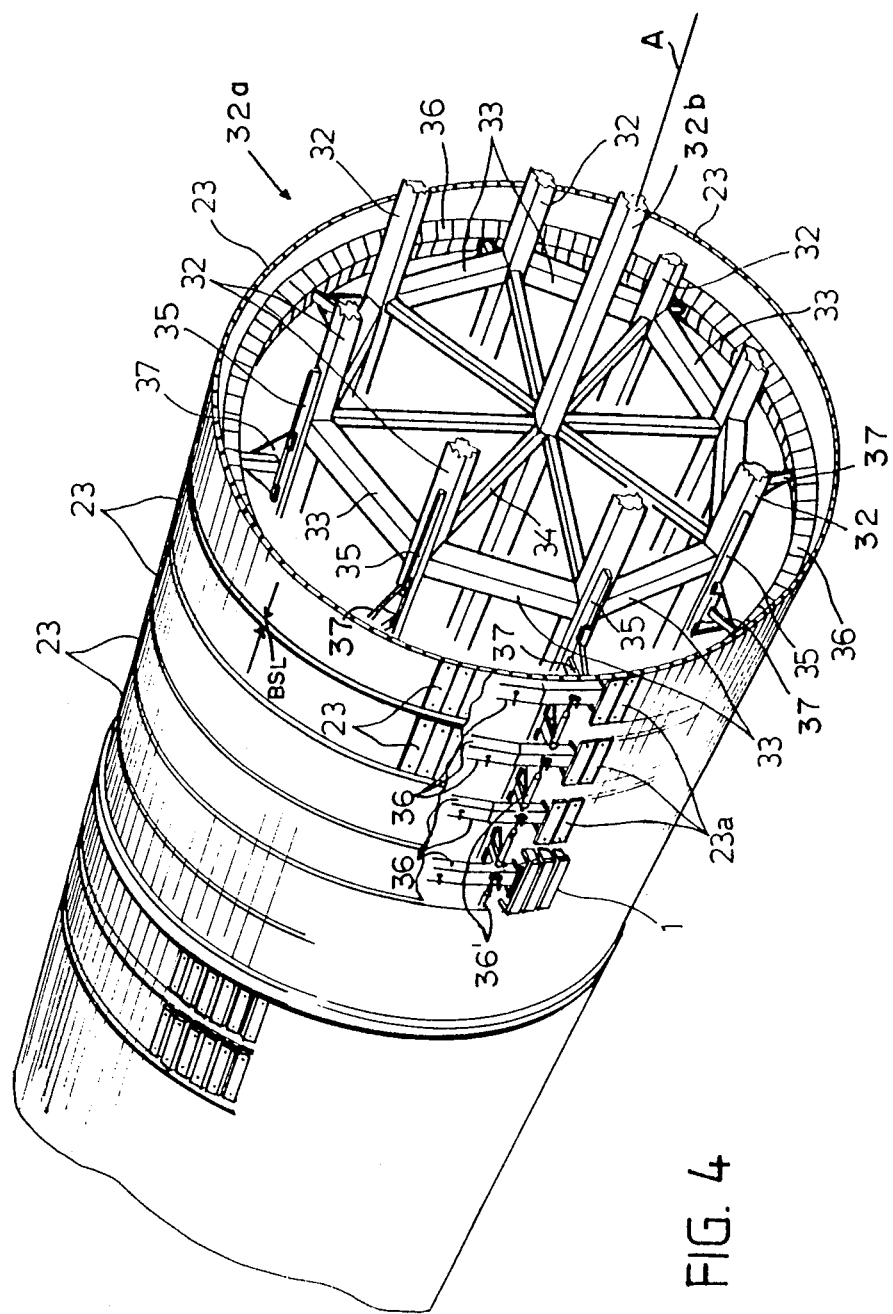
FIG. 4 shows a perspective view of a supporting mandrel structure forming part of the present apparatus for manufacturing structural components as disclosed herein.

DETAILED DESCRIPTION OF PREFERRED EXAMPLE EMBODIMENTS AND OF THE BEST MODE OF THE INVENTION:

FIGS. 1a and 1b show a mold body 1 including a central mold member 2 having two longitudinal walls tapering substantially radially outwardly so as to converge radially outwardly relative to a central longitudinal axis A shown in FIG. 4. The mold body further comprises two lateral mold members 3 and 4 each having a first longitudinal wall facing inwardly toward the tapering walls of the central mold member 2 and having a taper corresponding to the first mentioned tapering, whereby the withdrawal of the central mold member 2 radially inwardly relative to said central axis A is facilitated as will be described in more detail below. Each of the lateral mold members 2 and 3 also has a second longitudinal wall facing outwardly away from the central mold member 2. In the assembled condition shown in FIG. 1a the longitudinal, outwardly facing surface areas 12a, 12b together with the short end surfaces 12c and 12d form a continuous frame type mold surface for carrying tapes of fiber reinforced synthetic material in the form of so-called prepregs which are wound around the frame type mold surfaces 12a to 12d in a conventional winding or bandaging operation. All surfaces contacted by the prepregs are first conventionally coated to prevent sticking. The forward facing end of the mold body is supported by a rib bracket 5. The rearward facing end of the mold body is supported by a second rib bracket 5a.

A plurality of such mold bodies 1 as just described, are assembled, after the conventional winding or bandaging operation is completed, in an apparatus as will be described below. In their assembled condition the mold bodies define the curved wall and as a result of the curing, the stiffening grid structure and the outer planking are bonded to each other. In the assembled condition all the mold bodies are located in a three-dimensional coordinate system X, Y, and r, as shown in FIG. 1a, whereby the x direction extends in parallel to the central longitudinal axis A shown in FIG. 4, whereby the r direction is the radial direction relative to said longitudinal axis A, and wherein y is the circumferential direction, for example, of a cylindrical fuselage section, or rather the tangential direction.

Figure 3:
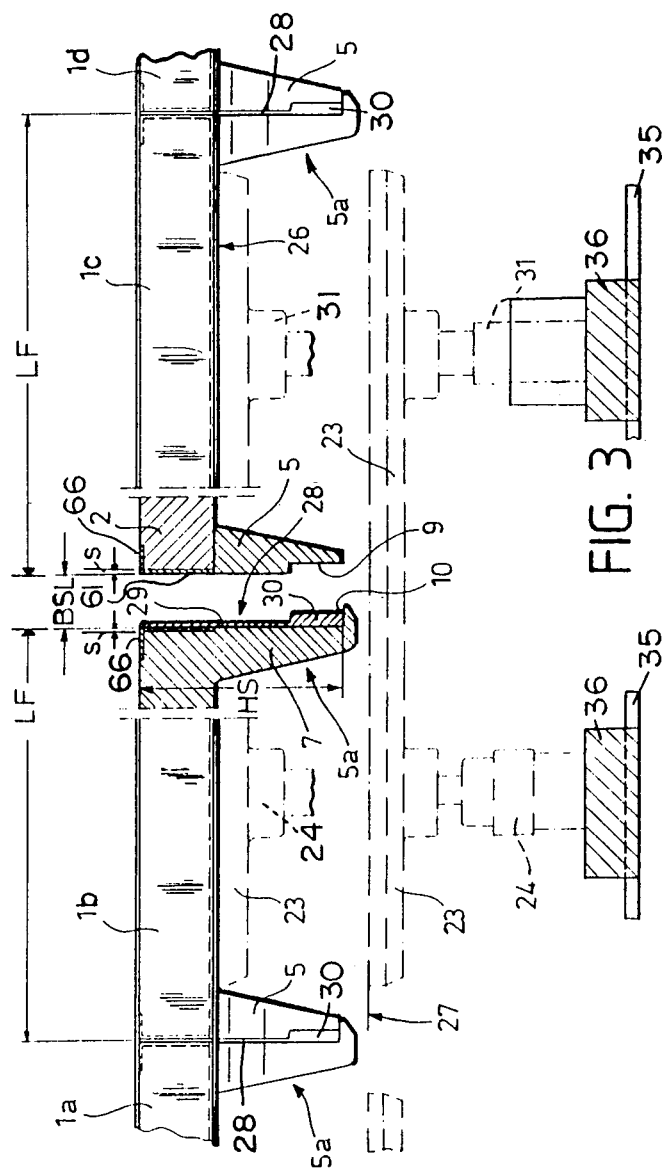
FIG. 3 is a partial sectional view through an assembly along a plane extending longitudinally through the central axis of the tubular structural component shown in FIG. 4.

As seen in FIG. 1b, the forward rib bracket 5 is a separate component which is connected to the mold members 2, 3 and 4 by conventional means, for example, snap-in members symbolically shown at 11. On the other hand, the rear rib bracket 5a is formed by three integral, one piece extensions 6, 7, and 8 of the mold members 3, 2 and 4, as shown in FIG. 1b. These extensions 6, 7, and 8 together form the rear rib bracket 5a when the mold members and brackets are assembled as shown in FIG. 1a. Both rib brackets 5 and 5a protrude slightly in the longitudinal direction to an extent "s" as shown in FIG. 1a and also in FIG. 3. The spacing "s" accommodates the tape when it is wound around the surface 12a to 12d. The rib bracket 5 has a recess 9 while the rib bracket 5a has a shoulder 10 on which the lower end of the rib bracket 5 may rest in the assembled condition as shown in FIG. 3. The recess 9 is provided for a rib reinforcement to be described below. Incidentally, the longitudinal mold members 2, 3, and 4 are also interconnected by conventional snap-in elements 11, whereby the mold members are easily attached to each other and released from each other. FIG. 1c shows a tape or prepreg strip 61 provided with cut-outs 62 at spaced intervals along one edge thereof and with slots 63 opposite the cut-outs 62. The tape 61 of fiber reinforced synthetic material which is not yet cured is then conventionally wound around the mold body 1 so that the tape covers the surfaces 12a, 12b, 12c, and 12d as shown in FIG. 1d. The width 64 of the tape 61 is larger than the width of the walls 12a to 12d so that the edges of the tape protrude above and below the mold body 1 except at the downwardly facing end edges where the cut-outs 62 are located, also as shown in FIG. 1d. After the winding operation is completed, the edges or margin of the tapes 61 are folded over as shown in FIGS. 1e and 1f. After the assembly of the wound mold bodies to form the curved wall of the structural component and after the curing of the fiber composite material of the tapes 61, the mold bodies are easily removed from the resulting grid structure due to the cut-outs 62 which permit moving the central mold member 2 downwardly or radially inwardly as indicated by the arrow 65 in FIG. 1f after the mold member 5 has been removed. After the central mold member 2 has been removed, the lateral mold members 3 and 4 are moved inwardly toward each other and down in the direction of the arrow 65. This removal of the mold body from the finished structure is greatly facilitated by the longitudinal division of the mold body into three mold members 2, 3 and 4 and by the radially outwardly converging side walls of the central mold member 2. The mold members 2, 3, and 4 form with their top surface 13 a curvature in accordance with the curvature of the fuselage. Thus, during the curing of the assembly, the planking rests on the curved surface 13 and thereby assumes the required curvature. The surface 13 is surrounded by grooves 14, 15, 16 and 17 adjacent the edges of the mold body. These grooves provide space into which the margins of the tape 61 are folded as shown in FIGS. 1e and 1f. Corresponding grooves not visible in FIG. 1a are also provided along the longitudinal, downwardly facing edges of the mold bodies 3 and 4. As mentioned above, the end surfaces 18 and 19 of the rib brackets 5 and 5a project by the distance "s" in the longitudinal direction to provide the space needed for the rib forming tape portions above the cut-outs 62. The size of the spacing "s" will depend on the number of prepreg strips 61 to be wound around the mold body 1. Normally, several windings will be employed to form a multilayered box frame. However, even a single layer may be used under certain circumstances, for example, where smaller bodies are involved.

Figure 2:
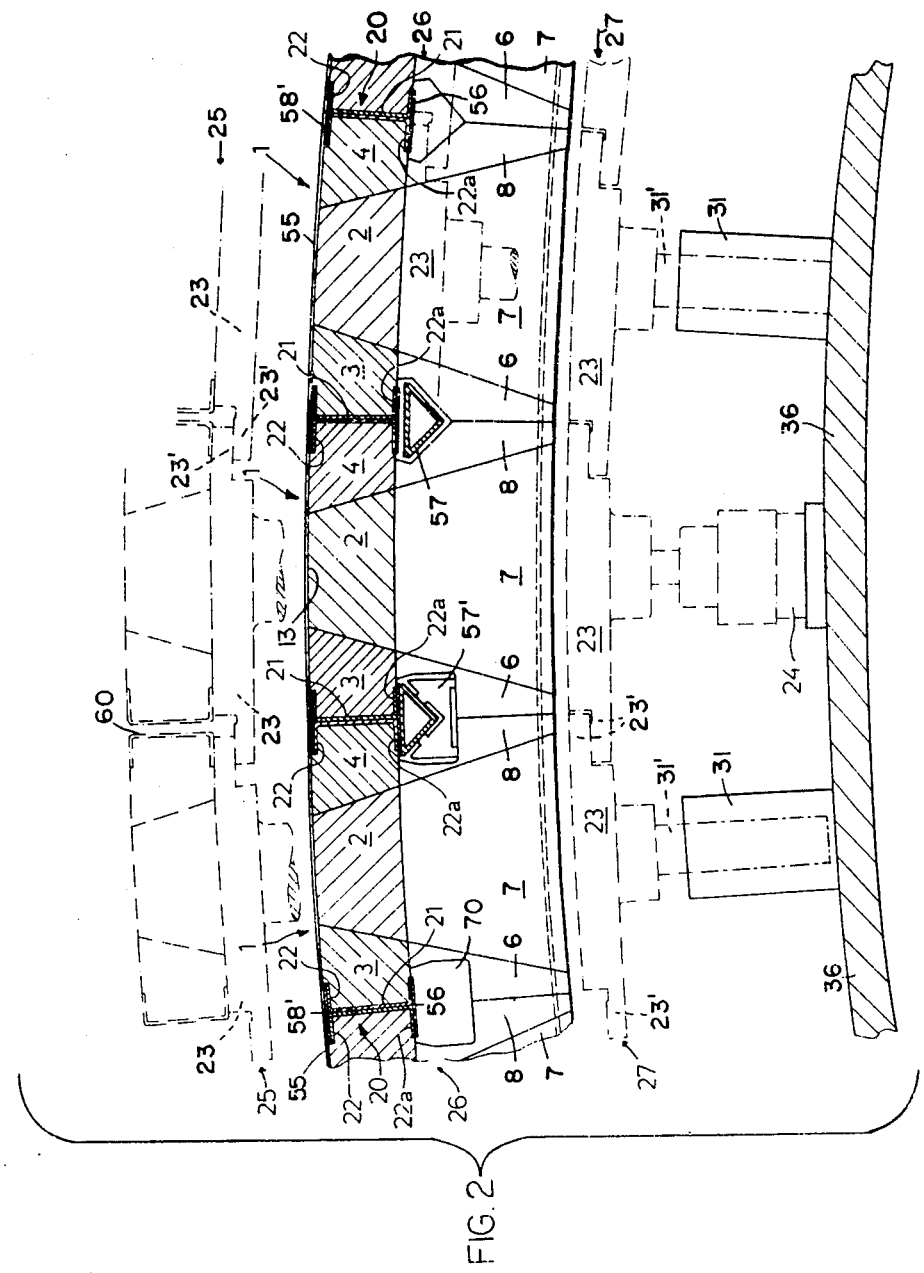
FIG. 2 is a sectional view in a plane extending perpendicularly to the central longitudinal axis in FIG. 4, and employing mold bodies as shown in FIGS. 1a and 1b, only three mold bodies are shown.

FIG. 2 shows a partial sectional view through an apparatus for constructing an aircraft fuselage, whereby the section plane extends perpendicularly to the longitudinal axis A in FIG. 4, and whereby the view direction extends in the direction of the axis A. Only three form bodies are shown in their full section in FIG. 2, while the form bodies to the left and right are shown broken away. According to the here employed division, for example, a total of ninety-six mold bodies 1 are distributed around the circumference of the fuselage, thereby forming ninety-six stringers 20 having an I-beam cross-sectional shape and extending in parallel to the longitudinal axis A. Due to the bonding of adjacent tapes to each other which initially have a U-configuration, the resulting stringers 20 have a radially extending double web section 21 and a radially outwardly located flange section 22, as well as a radially inwardly located flange section 22a. The radially outer top surface 13 of all the mold bodies is covered by a planking 55 applied as will be described below. The mold bodies 1 are supported on carrier plates 23 in a conventional manner, for example, the carrier plates 23 may be provided with a plurality of plug-in pins not shown, but reaching with a slight press fit into respective holes 67 shown in FIG. 6. Each carrier plate 23 is supported by a radially adjustable piston cylinder device 24 which in turn is secured to a wheel rim type ring 36 forming part of a central mandrel to be described below with reference to FIG. 4. Each carrier plate 23 is further supported by at least one radial guide device, such as a guide bushing 31 in which a guide rod 31' is radially slidable. Two guide bushings 31 are shown in FIG. 2 for convenience of illustration. However, in actuality, these guide bushings would be located in a plane in front of or in a plane behind the plane defined by the sheet on which FIG. 2 is shown. The radial adjustment devices 24 do not need to be piston cylinders. Any type of drive, for example, a rack and pinion drive, may be used to bring the carrier plates 23 into three defined positions 25, 26, and 27 as shown in FIG. 2. The carrier plates have longitudinal edges 23' of a reduced thickness and facing alternately up or down for a sliding cooperation with adjacent carrier plates 23 as these plates are moved radially between the positions 25, 26, and 27. In the radially outermost position 25, which may be defined by stops not shown, the carrier plates 23 are sufficiently spaced from one another around the circumference of the fuselage to be formed, whereby mold bodies with the tape wound around the mold bodies may be conveniently attached to the carrier plates 23 so that a gap 60 is formed, extending longitudinally substantially in parallel to the central axis A. When all the mold bodies have been attached to the carrier plates 23, the latter are moved radially inwardly into the position 26, whereby the web sections 21 contact each other for the curing and resultant bonding to be described in more detail below. The grid structure so formed remains in the position 26 when, after curing, the central mold members 5 and the lateral mold members 3, 4 are removed from the grid structure. At that time the carrier plates 23 have been moved radially inwardly into positon 27 and out of the structural component, as will be described below.

As also shown in FIG. 2, the rib support brackets 5 and 5a are provided with cut-outs 70 for the application for reinforcing strips 56 of fiber compound material which are bonded to the flanges 22a of each stringer 20 with the aid of a tool 57 to be inserted into the cut-outs 70 and held therein by a bracket 57' pressing the tool 57 and thus the respective strips 56 in place during the curing and bonding. Similarly, a strip 58 is attached to the radially outer flanges 22 prior to the application of the outer planking 55.

FIG. 3 shows a side view substantially in the circumferential direction, whereby four mold bodies 1a, 1b, 1c and 1d are visible, and whereby the mold bodies 1b and 1c are interrupted so as to fit them onto the sheet and not to show their entire length LF. Further, the right-hand end portion of the mold body 1b and the left-hand end portion of the mold body 1c are shown in section for explaining the insertion of rib reinforcing belt segments 28 which extend circumferentially around the fuselage in the ribs. For this purpose adjacent mold bodies are spaced initially from one another in the longitudinal direction to form a gap BSL for said insertion of the rib reinforcing belt segments 28 of fiber composite material. After such insertion the adjacent mold body is moved into contact with the inserted belt segment 28, whereby the gap BSL is removed for the bonding and curing. Only one carrier plate 23 is shown in its full length in FIG. 3 in the radially inward position 27. These carrier plates are movable in the axial direction along guide rails 35 carrying the radial adjustment cylinders 24 and the radial guide members 31 as described above with reference to FIG. 2. By axially positioning the carrier plates 23 the gap BSL can be closed.

Figure 6:
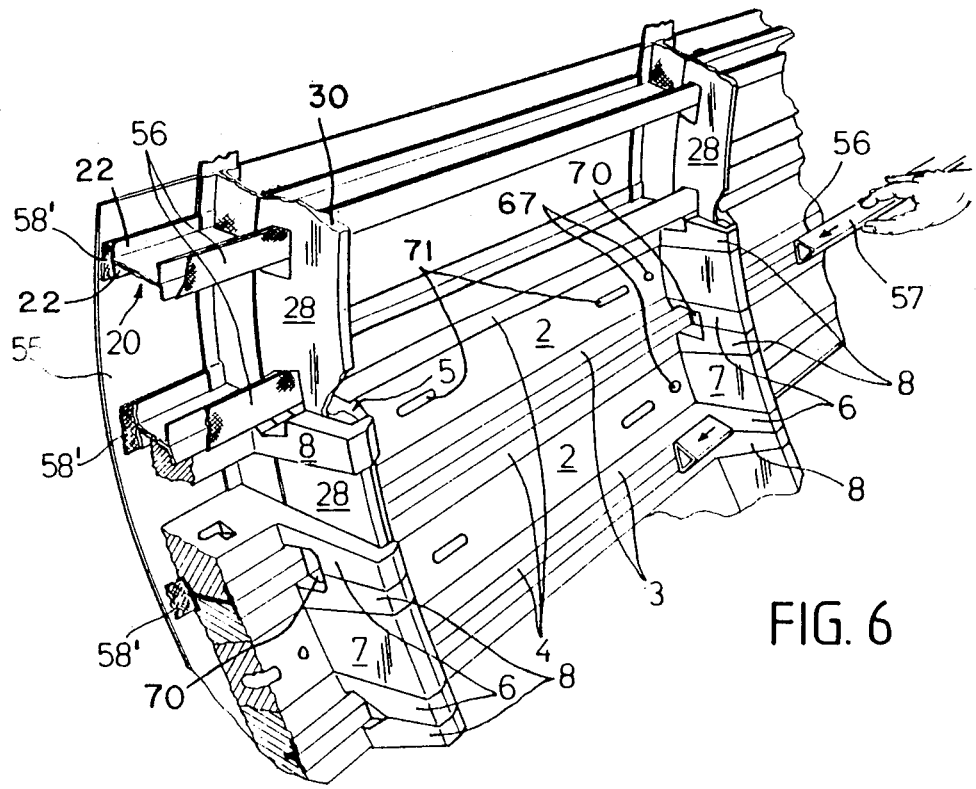
FIG. 6 is a perspective view into a portion of a tubular component of the invention with some of the mold bodies already removed and with further mold bodies yet to be removed.

The rib reinforcing belt segment 28 as shown in FIG. 3 has a web section 29 and an edge reinforcing strip 30 also of fiber reinforced synthetic material extending circumferentially and radially inwardly of the grid structure as best seen in FIG. 6. Thus, these reinforcing strips 30 are located below the respective rib formed by two flanges 66 and the respective tape portions 61. However, the web section 29 of the belt segment 28 reaches between the rib forming tape portions 61. Each of the rib reinforcing belt segments 28 has a length, in the circumferential direction, which is slightly larger than the respective width of the mold body so that segments 28 of adjacent rib sections overlap each other in the circumferential direction to form a closed ring inside the rib sections. Preferably, the circumferentially protruding ends of the segments 28 are tapered at an angle of about 1.5° to provide a splicing type of overlap joint between circumferentially adjacent segments 28. Further, due to the above described shape of the rib brackets 5 and 5a with the recess 9 and the shoulder 10, the segments 28 are supported entirely on all sides, except the radially outer edge when the two adjacent mold bodies are moved together in the axial direction. Thus, after curing the rib reinforcing segments 28 will have the respective cross-sectional shape, see FIG. 3.

FIG. 4 shows a perspective view of the mandrel or arbor 32a for supporting the mold body carrier plates 23. The arbor 32a is constructed as a truss work forming a cage, whereby the truss components are made of, for example, tubular steel sections having a rectangular cross-sectional shape. The cage comprises a central shaft 32b and eight axially outer longitudinal beams 33 connected to the central shaft 32b by spokes 34. In the circumferential direction the beams 32 are interconnected by sections 33. All the cage forming truss sections are interconnected by conventional means, for example, welding. The sections 33 function as stiffening members and form, together with the longitudinal beams 32, an octagonal cross-sectional shape of the cage. The apparatus further comprises a plurality of wheel rim type members forming rings 36 which are secured to the longitudinal beams 32 by brackets 37 which are slidably held in place by a form fit on axial guide rails 35 for axially locating the rings 36 along the length of the longitudinal beams 32. Adjacent rings 36 are interconnected in the axial direction by piston cylinders 36' for controlling the gap width BSL shown in FIG. 3, and for closing the gap BSL. The carrier plates 23 are secured to these rings 36 as mentioned above. The radial adjustment cylinders 24 and the radial guide bushings 31 are not shown in any detail in FIG. 4. However, FIG. 4 does show that most carrier plates 23 are in the intermediate molding and curing position 26 while only a few carrier plates 23a are shown in the radially outer mold body mounting position 27. In the central lower middle position of FIG. 4, three mold bodies 1 have already been mounted to the respective carrier plate.

Depending on the type of structural component to be manufactured, the mandrel or arbor 32a may have different diameters along its length, for example, to form a conical configuration. In that case, the rings 36 are adjustable relative to each other only within a certain axial range in which the particular rings have the same diameter. As mentioned, the radial adjustment cylinders 24 and the radial guides 31 are secured to the rings 36. However, the manner of attachment may be selected in accordance with individual requirements. For example, in FIGS. 2 and 3 the members 24 and 31 are secured to the circumference of the respective rings 36, whereas in FIG. 4, these members 24, 31 are secured to the sides of the rings 36. In any event, the displacement of the carrier plates 23, 23a will always be in the radial direction for achieving the above described different positions 25, 26, 27.

The above mentioned division using ninety-six meld bodies around the circumference of the fuselage also results in ninety-six stringers 20. With this division there will be forty-eight cylinders 24 and forty-eight guide bushings 31 alternately distributed around a respective ring 36 so that the angular division will be 3°, 45 minutes between the radial axes of a cylinder 24 and an adjacent radial guide bushing 31 on the same ring 36. The cylinders 24 also alternate with guide bushings 31 in the longitudinal, axial direction. Each carrier plate 23, 23a is supported by a cylinder 24 and a guide 31. Due to the alternating arrangement of cylinders and guides, it is possible to replace one half of the number of cylinders by a respective number of the mentioned guide bushings 31, thereby reducing the costs.

Due to the above mentioned overlapping edges 23' of the carrier plate 23 it is possible that the portion of a carrier plate which is supported by a guide rather than by a piston cylinder is driven by the next adjacent cylinder located circumferentially around the respective ring 36.

Figure 5:
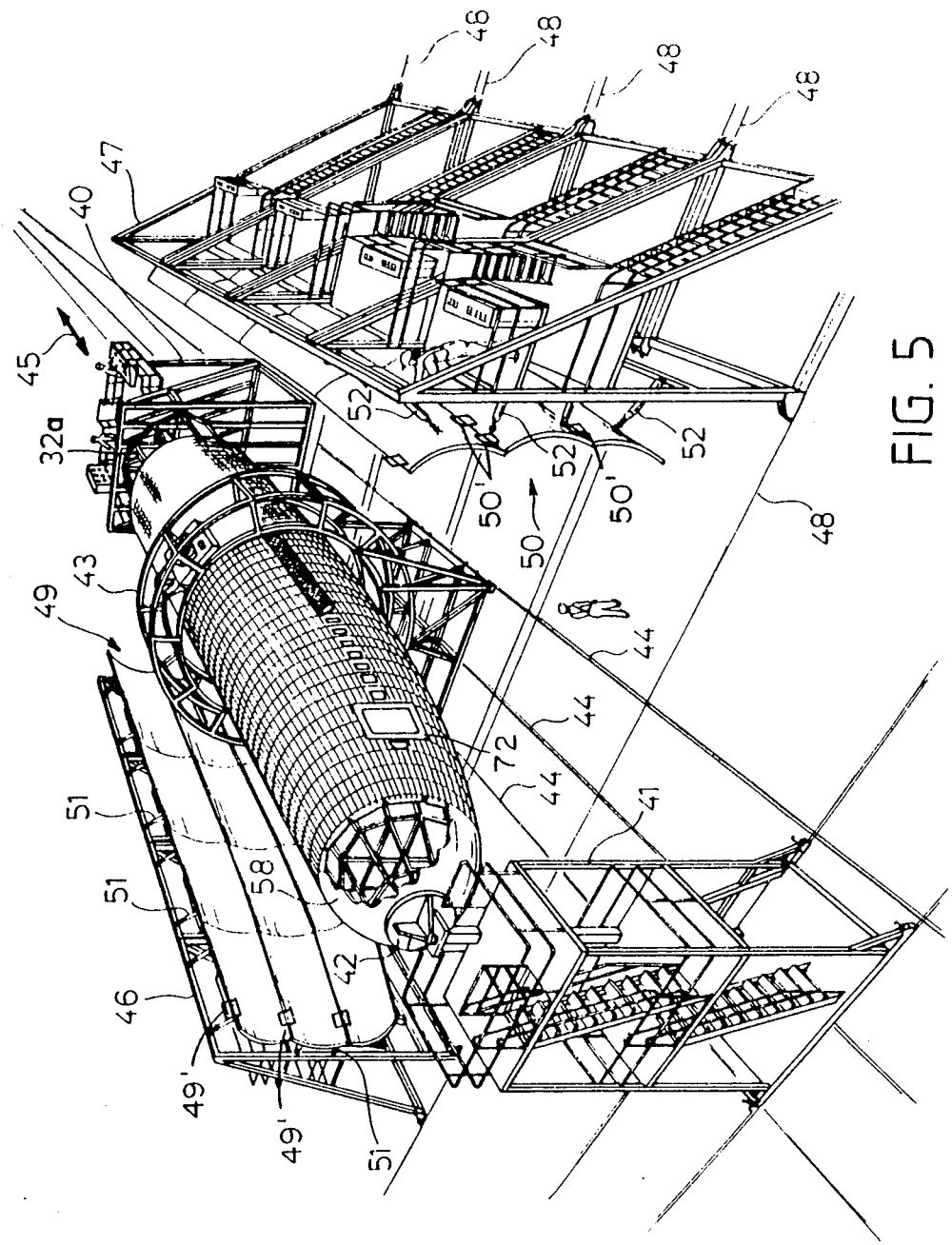
FIG. 5 shows a perspective view of the entire manufacturing apparatus according to the invention employing a mandrel as shown in FIG. 4.

FIG. 5 shows a perspective overview of the apparatus according to the invention, for manufacturing curved wall structural components such as an aircraft fuselage. The apparatus comprises a scaffolding 40 to which the mandrel or arbor 32a is attached with its large diameter end in a bending stiff manner. In the front part of FIG. 5 there is a further scaffolding 41 which supports the front end of the arbor 32a by means of a mounting member 42. The front end of the arbor 32a is closed by a cover 58 suitable for closing the space inside the arbor in a pressure-tight manner. The mounting member 42 permits detaching or disconnecting the front end of the arbor from the scaffolding 41. A bandaging or winding apparatus 43 supported on rails 44 for travelling in the axial direction of the arbor 32a surrounds the arbor and the mold bodies mounted thereon for applying the planking 55 as will be described below. The bandaging apparatus 43 is movable back and forth in the direction of the arrow 45.

Additional scaffold frames 46 and 47 carry heatable mold shells 49 and 50 which are supported by piston cylinders 51, 52 respectively. For example, twelve mold shells 49 and twelve mold shells 50 are provided on each side. These mold shells are interconnected with each other by conventional hinge elements 49' and 50' so that the mold shells may be moved with the aid of the respective piston cylinders 51, 52 into a mold bodies enclosing position. Hinge barrels may be provided along the upper and lower edges of the mold shells for interconnecting the mold shells carried on frame 46 with the mold shells carried on frame 47. Both frames 46, 47 are movable on rails 48 perpendicularly to the axial direction A.

The apparatus described will be used in the following manner for manufacturing an aircraft fuselage. In the circumferential direction the individual sections of the fuselage are seamless or closed and the following steps will be performed substantially in the stated sequence.

Step (a): Prepreg tapes 61 are wound or bandaged around the surfaces 12a, 12b, 12c, and 12d to form at least one, preferably several, layers of fiber composite material around the mold bodies.

Step (b): The wound or bandaged mold bodies 1 are secured to the carrier plates 23 on a first ring 36 whereby the carrier plates 23 are in the mounting position 25 shown in FIG. 2.

Step (c): The plates 23 and bodies 1 are moved into the molding position 26, whereby the longitudinal sides of the mold bodies contact each other to form the I-beams or stringers 20 shown in FIG. 2. This radially inward movement exerts a sufficient pressure on the fiber compound material for the subsequent curing and bonding.

Step (d): Mounting further bandaged mold bodies 1 on the carrier plate 23 of the next ring 36.

Step (e): Moving the carrier plates of the next ring 36 into the molding position 26, whereby the above mentioned gap BSL is initially provided between the end surfaces of two mold bodies in the axial direction.

Step (f): The rib reinforcing belt segments 28 are now inserted into the gaps BSL as shown in FIG. 3. It should be noted here, that the belt segments 28 may also be attached to an axial end of the first group of mold bodies even before the second group of mold bodies is mounted on the carrier plates of the next adjacent ring. In any event, when the segment belts 28 are in place, the next step is performed.

Step (g): Moving the second ring closer to the first ring 36 with the aid of the piston cylinders 36' to remove the gap BSL and press the belt segment 28 into place as shown in FIG. 3 at the left and right ends in FIG. 3.

Step (h): Attaching or mounting the mold bodies 1 to the carrier plates 23 of the third ring with the plates being in the radially outward position 25.

Step (j): Inserting the belt segment 28 into the next gap and so forth until the entire body section has been completed as just described.

Step (k): Bandaging the mold bodies and thus the fuselage with prepreg bands, thereby using the winding apparatus 43 which has a component of conventional construction travelling all around the fuselage to apply the planking 55. For this purpose the prepreg band is mounted as a coil in the bandaging or winding apparatus 43 and that coil travels around the fuselage.

Step (l): The scaffold frames 46 and 47 are now moved toward the fuselage and the molding shells 49, 50 are pressed against the planking 55. The winding or bandaging apparatus 43 has been moved out of the way for this purpose, for example, all the way close to the scaffold 40 at the far end of the mandrel 32a.

Step (m): The piston cylinders 24 are now operated for moving the carrier plates 23 into the position 27 shown in FIG. 2, whereby the snap-in connections between the carrier plates 23 and the mold bodies 1 are centrally released by presurized air, for example, since the mold bodies stay in place until the curing and bonding is completed.

Step (n): The arbor 32a with the carrier plates 23 is moved out of the structural component. For this purpose the mounting member 42 is disconnected from the front end of the arbor. The mold bodies 1 still remain in place since the molding shells 49, 50 hold the structure in place and the mold bodies cannot move radially inwardly.

Step (o): Insertion, if desired, of reinforcing strips 56 of fiber composite material to strengthen the inner flange 22a of the stringers 20.

Step (p): rubber sheets are inserted into the structure to cover all surfaces.

Step (q): The space between the mold bodies 1 mold shells 49,50 and the rubber sheets is evacuated for avoiding air bubbles inside the fiber composite material.

Step (r): The mold shells 49 and 50 are now heated.

Step (s): Compressed air is introduced (inside of the structure) and the rubber sheets (are pressed against the mold bodies 1 and the mold bodies 1 against mold shells 49, 50 by compressed air.

Step (t): The structural component is now cured in accordance with the requirements for the particular prepreg material. These requirements are usually furnished by the manufacturer of the prepreg fiber composite material.

Step (u): The heating of the mold shells 49, 50 is switched off and the cooling takes place as well as the removal of the compressed air.

Step (v): The mold bodies are now removed from the structural component as described above.

The mold shells 49, 50 of FIG. 5 are also made of fiber compound material, for example by a manufacturing method as described in the above mentioned related disclosure. The shape of the mold shells determines the outer contour of the three-dimensional aircraft fuselage. These shells and the frames 46, 47 take up the inner pressure which is applied during the curing when the space between the rubber sheets inside the structural component and the mold bodies is pressurized. Thus, these shells 49, 50 are rigidly interlocked around the circumference of the structural component, for example by the above mentioned hinge members 49', 50'. It has been found that the fiber compound material of the shells 49, 50 in combination with the interlocking provides the required stiffness or rigidity that these shells must have in order to assure the dimensional stability, particularly the proper outer diameter of the structural components, irrespective of the internal pressure and irrespective of the heating during the curing and bonding. Both ends of the inner space are closed by cover members of which the front cover member 58 is shown in FIG. 5. These cover members are connectable to the shells 49 and 50 by means not shown, but of conventional construction. Thus, the apparatus itself forms the autoclave for the curing and bonding. This feature is a substantial saving because autoclaves of the sizes here involved are very expensive.

FIG. 6 shows a portion of the structural component in this case of an aircraft fuselage after the arbor 32a has been removed. In this condition the inner surfaces of the mold bodies 1 are accessible. The outer planking 55 has been applied and the mold shells 49 and 50 are pressing radially inwardly against the planking 55. The shells 49, 50 are not shown in FIG. 6. At this time the reinforcing belts 56 of prepreg fiber composite material are inserted to cover the stringer flanges 22a through the openings 70 mentioned above. The tool 57, such as a triangular section of metal may be used for pressing the belts 56 in place. If desired, further reinforcing belts 58' also of prepreg material are attached to the radially outer facing flanges 22 of the stringers 20 prior to the winding of the outer planking 56.

When the insertion of the belt 56 is completed, the inner surfaces of the mold bodies 1 and of the supporting tools 57 are covered with large surface area rubber sheets as mentioned above. These sheets are then closed tightly all around so that the space between the mold bodies and these sheets can be either evacuated or pressurized. When the space is pressurized the sheets form a bubble inside the structural component, whereby all elements that need to be bonded to each other are exposed to a compression during the curing which may be controlled by the pressurized air supplied into the bubble. As mentioned, the space should preferably be first evacuated prior to pressurizing so as to avoid the formation of air bubbles inside the fiber composite material.

Generally, the temperature for the curing will be approximately 125° C. and the pressure will be about 7 bar during the curing. The curing time will depend on the thickness of the structural elements to be bonded to each other and will normally be within the range of three to five hours. After the curing and hardening, the temperature is gradually reduced in accordance with a predetermined cooling speed whereupon the space inside the rubber sheets is again vented to the atmosphere. Upon completion of these steps the rubber sheets are removed and the mold bodies or rather, the mold members are also removed, for example, by reaching into the handle holes 71. The removal has been described in detail above. The upper portion of FIG. 6 shows the structural component after the removal of the mold bodies. The lower portion still shows the mold bodies prior to removal.

As shown in FIG. 3, the belt segments 28 for reinforcing the ribs have a radial height HS corresponding to a multiple of the radial height of the ribs shown approximately at 64' in FIG. 1c. A useful range for the radial height of the belt segment 28 would be 1.5 to 6 times the height 64' of the ribs or of the height of the stringers 20.

After completion of the mold body removal, the structural component is supported, for example, by an overhead crane and thereafter, the mold shells 49, 50 are removed prior to any further manufacturing steps not related to the present invention.

Zones of the fuselage where external forces will be introduced into the planking 55 of the fuselage may be reinforced by additional fiber layers. For this purpose, the form bodies in the respective zones are provided with depressions or cut-outs into which these additional layers may be inserted. Similar reinforcements are provided around openings in the fuselage, for example, as shown at 72 in FIG. 5, such as window or door openings. Preferably, these openings are cut into the fuselage after the curing and then reinforced. However, other reinforced zones may be provided by inserting respective layers into recesses in mold bodies 1 for curing with the entire structure. One example of also reinforcing the planking 55 is shown at 58' where the respective belts reinforce the flanges 22 of the stringers 20 as well as the planking 55.

Rather than wrapping or winding the planking 55 as described above with reference to the winding apparatus 43, it is possible to form the planking 55 by overlapping rings having a zero pitch or by using overlapping longitudinal strips or layers of fiber composite material. A crosswise application of the fiber layers employing strips running longitudinally and circumferentially may also be employed. Rather than running a coil of prepreg tape with the apparatus 43 around the structural component, it is possible to instead rotate the structural component about its longitudinal axis A, whereby the prepreg tape material is pulled off a supply coil. This latter operation is suitable, especially for smaller aircraft fuselages and has the advantage of reducing costs.

Depending on the size of a structural component, it will generally be possible to construct such components in a seamless manner. However, under certain circumstances it may be practical to divide the entire fuselage into two or more half shells or sections which are manufactured as described herein and then interconnected along a seam by conventional means.

Although the invention has been described with reference to specific example embodiments, it will be appreciated, that it is intended to cover all modifications and equivalents within the scope of the appended claims.

What is claimed is:

1. An apparatus for constructing a structural component having a longitudinal central axis and a curved wall extending relative to said central axis, said curved wall comprising longitudinally extending stringers, crosswise extending ribs forming a grid structure with said stringers, and planking means covering said grid structure, said stringers, ribs, and planking means being made of fiber reinforced synthetic material and bonded to one another by curing of said synthetic material, said apparatus comprising a plurality of individual mold means having mold surfaces for carrying tapes of said fiber reinforced synthetic material wound onto said mold surfaces and being longitudinally and circumferentially spaced for receiving said longitudinal stringers and said crosswise ribs respectively therebetween, internal mandrel means extending coaxially with said central axis for supporting said mold means, axial and radial position adjustable support means operatively secured to said mandrel means for individually carrying and axially and radially adjusting said mold means on said mandrel means, axial adjustment means arranged on said mandrel means for adjusting the axial position of said support means, whereby the axial spacing between said mold means carried by said support means is adustable, and radial adjustment means arranged for adjusting the radial position of said support means, thereby adjusting the circumferential spacing between said mold means carried by said support means such that the stringers and ribs may be positioned between the individual mold means and releasably held therebetween.

2. The apparatus of claim 1, wherein said mold means comprise a central mold member having two longitudinal walls tapering substantially radially outwardly so as to converge radially outwardly relative to said central longitudinal axis, and two lateral mold members each having a first longitudinal wall facing said tapering walls of said central mold member and having a taper corresponding to said first mentioned tapering for radially inwardly withdrawing said central mold member from its position between said lateral mold members each having a second longitudinal wall facing outwardly.

3. The apparatus of claim 1, wherein said mandrel means comprise a truss structure forming a substantially circular cage including longitudinal beams said axial adjustment means on said longitudinal beams carrying said support means for locating said support means in the axial direction along said longitudinal beams, and wherein said racial adjustment means comprise radially extending piston cylinder means connecting said support means to said circular cage for radially adjusting the position of said support means relative to said central axis.

4. The apparatus of claim 3, wherein said support means comprise wheel rim members surrounding said cage and connected to said axial adjustment meand for axially locating said wheel rim members, and carrier plates connected through said piston cylinder means to said wheel rim members for radially adjusting said carrier plates.

5. The apparatus of claim 4, further comprising radial guide means operatively connected to said carrier plates and to said wheel rim members whereby said radial guide means extend in parallel to said radially extending piston cylinder means.

6. The apparatus of claim 1, wherein said mandrel means comprise pressure tight end closure means for enclosing a pressurizable space inside said mandrel means.

7. The apparatus of claim 1, wherein said mandrel means comprise a mandrel and mandrel scaffold means, said mandrel being connected in a substantially bending stiff manner to said scaffold means, said scaffold means supporting said mandrel above a support base.

8. The apparatus of claim 7, wherein said scaffold means comprise a separate scaffolding for each end of said mandrel.

9. The apparatus of claim 8, further comprising rail means for supporting said scaffold means, and support elements for movably supporting said scaffold means on said rail means.

10. The apparatus of claim 1, further comprising heatable mold shell means for enclosing a space around said mold means, scaffold frames, and piston cylinder means operatively securing said heatable mold shell means to said scaffold frames.

11. The apparatus of claim 10 further comprising carrier rails for supporting said scaffold frames for permitting said heatable mold shell means to be mound relectively toward mandrel and away from said mold means.

12. The apparatus of claim 10, wherein said heatable mold shell means comprise a plurality of individual shell sections and hinge means operatively interlocking said individual shell sections for enclosing said mandrel means having a substantially cylindrical shape.

* * * * *

UNITED STATES PATENT AND TRADEMARK OFFICE
CERTIFICATE OF CORRECTION

PATENT NO. : 4,717,330

DATED : January 5, 1988

INVENTOR(S) : Branko Sarh

It is certified that error appears in the above-identified patent and that said Letters Patent is hereby corrected as shown below:

```
In [57] Abstract, line 14, replace "ave" by --have--.
Claim 1, column 12, line 41, replace "adust" by --adjust--.
Claim 3, column 12, line 62, after "beams" insert --,--;
         column 12, line 66, replace "racial" by --radial--.
Claim 4, column 13, line  5, replace "meand" by --means--.
Claim 11,column 14, line 13, after "10" insert --,--;
         column 14, line 15, replace "mound" by --moved--;
         column 14, line 16, replace "relectively" by
                             --selectively--;
         column 14, line 16, delete "mandrel".
```

Signed and Sealed this

Ninth Day of August, 1988

Attest:

DONALD J. QUIGG

Attesting Officer

Commissioner of Patents and Trademarks